United States Patent
Wilker et al.

(10) Patent No.: US 9,416,282 B2
(45) Date of Patent: Aug. 16, 2016

(54) ANTIFOULING BY ADHESION SUPPRESSION

(75) Inventors: Jonathan Wilker, Lafayette, IN (US); Joshua Cloud, Hillsboro, OH (US); Christopher Clark, West Lafayette, IN (US); Thomas McCarthy, Indianapolis, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 14/118,052

(22) PCT Filed: May 16, 2012

(86) PCT No.: PCT/US2012/038080
§ 371 (c)(1),
(2), (4) Date: Nov. 15, 2013

(87) PCT Pub. No.: WO2012/162050
PCT Pub. Date: Nov. 29, 2012

(65) Prior Publication Data
US 2014/0076194 A1    Mar. 20, 2014

Related U.S. Application Data

(60) Provisional application No. 61/488,413, filed on May 20, 2011.

(51) Int. Cl.
C09D 5/16    (2006.01)

(52) U.S. Cl.
CPC ............ C09D 5/1625 (2013.01); C09D 5/1693 (2013.01)

(58) Field of Classification Search
CPC ........................... C09D 5/1625; C09D 5/1693
USPC .................. 523/122; 106/15.05, 18.32, 18.34
See application file for complete search history.

(56) References Cited

U.S. PATENT DOCUMENTS

| | | | |
|---|---|---|---|
| 4,596,864 A * | 6/1986 | Trotz et al. ................. | 424/78.09 |
| 4,904,504 A | 2/1990 | Isozaki et al. | |
| 6,063,734 A | 5/2000 | Ogura et al. | |
| 6,207,290 B1 | 3/2001 | Blum et al. | |
| 6,248,806 B1 | 6/2001 | Codolar et al. | |
| 6,462,049 B1 | 10/2002 | Ogura et al. | |
| 6,525,125 B1 | 2/2003 | Giardello et al. | |
| 6,794,461 B2 | 9/2004 | Fujita et al. | |
| 7,132,567 B2 | 11/2006 | Alberte et al. | |
| 7,141,646 B2 | 11/2006 | Kitano et al. | |
| 7,226,484 B2 | 6/2007 | Chen | |
| 7,439,308 B2 | 10/2008 | Ohno et al. | |
| 7,479,571 B2 | 1/2009 | Alberte et al. | |
| 7,661,164 B2 | 2/2010 | Chen | |
| 7,930,782 B2 | 4/2011 | Chen | |
| 2005/0080160 A1 | 4/2005 | Seabrook, Jr. | |
| 2007/0213426 A1 | 9/2007 | Abou-Nemeh | |

FOREIGN PATENT DOCUMENTS

| | | |
|---|---|---|
| WO | 9816109 | 4/1998 |
| WO | 2005017051 | 2/2005 |

OTHER PUBLICATIONS

International Search Report and Written Opinion issued in PCT/US2012/038080. Jan. 2, 2013.
International Preliminary Report on Patentability issued in PCT/US2012/038080. Nov. 28, 2013.
Wilker, Jonathan J., "Marine bioinorganic materials: mussels pumping iron," Current Opinion in Chemical Biology, 14:276-283, 2010/2009.
Burkett, Jeremy R., et al., "A Method for Measuring the Adhesion Strength of Marine Mussels," The Journal of Adhesion, 85: 601-615, 2009.
Supplemental Search Report issued in EP 12789435.0 Sep. 15, 2014.
First Examination Report issued in EP 12789435.0 May 19, 2015.
Mary J. Sever et al., Metal-Mediated Cross-Linking in the Generation of a Marine-Mussel Adhesive, Angew. Chem. Int. Ed., 2004, 448-450, vol. 43.

* cited by examiner

*Primary Examiner* — Edward Cain
(74) *Attorney, Agent, or Firm* — John V. Daniluck; Douglas G. Gallagher; Bingham Greenebaum Doll LLP

(57) ABSTRACT

The disclosure described herein includes antifouling compositions, methods of antifouling by adhesion suppression and methods of selecting an antifouling composition which suppresses marine animal adhesion or reduces the strength of marine animal adhesion by reducing or quenching the oxidative adhesion chemistry of the marine animal.

16 Claims, 7 Drawing Sheets

ANTIFOULING BY ADHESION SUPPRESSION

GOVERNMENT LICENSE RIGHTS

This invention was made with government support under N00014-10-1-0098 and N00014-07-1-0082 awarded by the Office of Naval Research. The government has certain rights in the invention.

BACKGROUND

Ships hulls and other surfaces kept in ocean waters are continually fouled by marine organisms such as barnacles, algae, and mussels. Fouling means that marine organisms attach to ship hulls. Fouling increases drag, reduces ship speed, and greatly increases fuel usage, along with environmental pollution.

Estimates of the impact of fouling are difficult to obtain. However there are some broad examples. In 1990 the United States Navy estimated that fouling increased fuel consumption by $500 million per year. The commercial shipping industry runs far more ships than the United States Navy and, consequently, uses much more fuel and incurs much more cost. The market potential for an improved antifouling coating could easily reach into the billions of dollars per year.

Current antifouling paints are painted on ship hulls and other surfaces kept in ocean waters. Current antifouling paints are used to reduce fouling by marine organisms. Current antifouling paints rely on release of metals, such as copper or sometimes tin, into the surrounding water. These metals act as general biocides and kill marine organisms. Metal pollution has had unintended consequences, such as the ability to kill all marine life beyond the ship hull such as within the surrounding water.

From an environmental perspective, this approach is not optimal. Tin coatings have been banned and legislation has passed to ban the use of copper-based coatings. However, no large scale alternative has been found. The phasing out of biocidal copper coatings may have been delayed until an alternative, non-toxic coating can be developed.

FIELD

This disclosure pertains to the field of fouling suppression through use of antioxidants, reducing agents and/or radical inhibitors or radical quenchers.

BRIEF DESCRIPTION OF THE DRAWINGS

The above-mentioned and other features of this disclosure, and the manner of attaining them, will become more apparent and the disclosure itself will be better understood by reference to the following description of embodiments of the disclosure taken in conjunction with the accompanying drawings, wherein.

Figure 1:
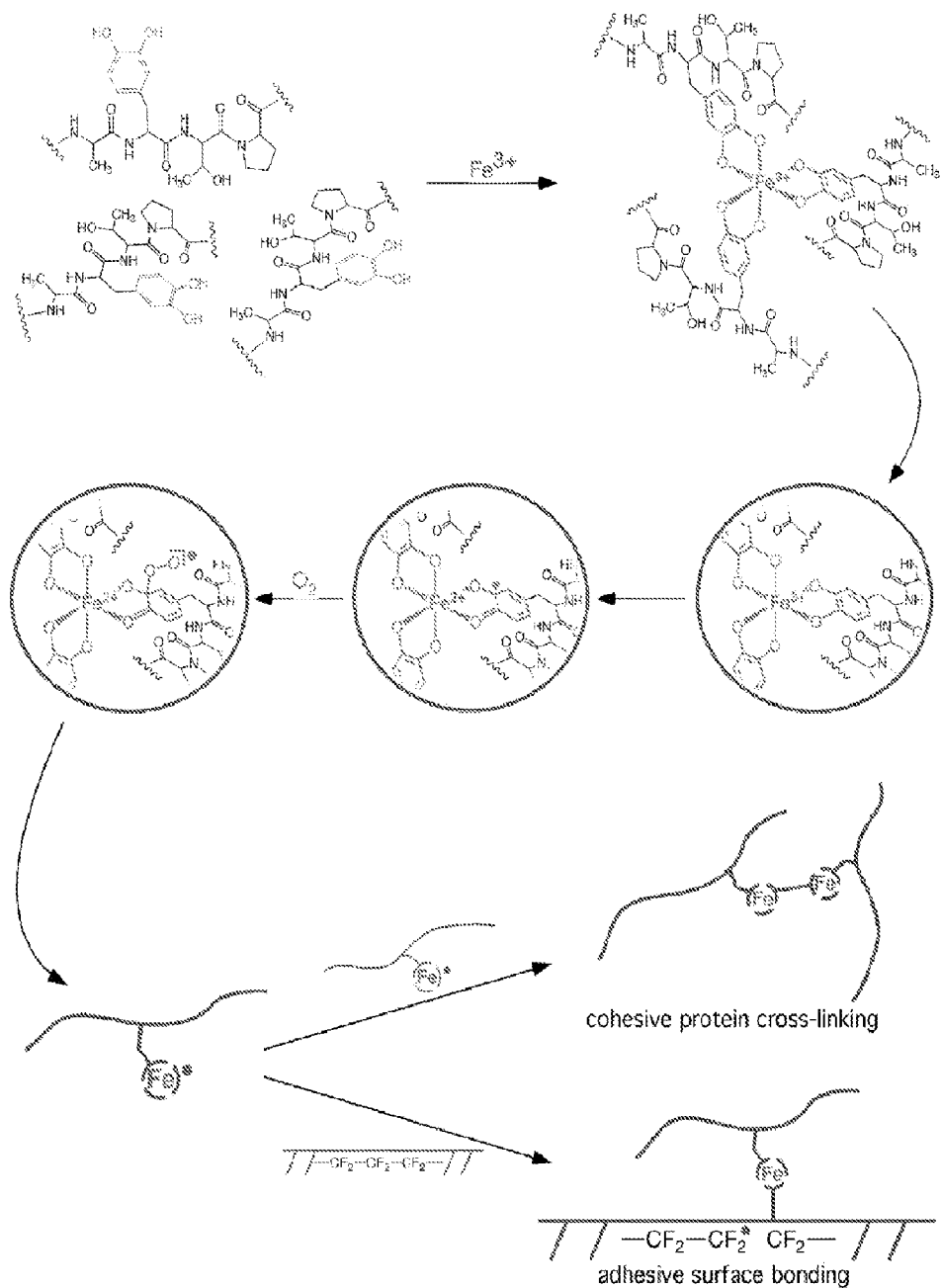
FIG. 1 is a schematic of images depicting a proposed mechanism for mussel adhesive formation.

Corresponding reference characters indicate corresponding parts throughout the several views. Although the drawings represent embodiments of the present disclosure, the drawings are not necessarily to scale and certain features may be exaggerated in order to better illustrate and explain the present disclosure.

SUMMARY

The disclosure includes an antifouling coating comprising an antioxidant within a coating configured to adhere to surfaces submerged in sea water, wherein the antioxidant is chemically unaltered by the coating, wherein the coating suppresses marine adhesion.

The disclosure also includes a method of inhibiting marine fouling comprising the steps of providing an antioxidant coating, applying the coating to a surface, wherein the surface is configured to be submerged in sea water, and suppressing marine adhesion through reduction chemistry.

The disclosure also includes a method of manufacturing an antifouling coating comprising the steps of providing an antioxidant which is stable in a coating, and including the antioxidant in the coating.

DETAILED DESCRIPTION OF THE EXEMPLARY EMBODIMENTS

The embodiments disclosed below are not intended to be exhaustive or limit the disclosure to the precise forms disclosed in the following detailed description. Rather, the embodiments are chosen and described so that others skilled in the art may utilize their teachings.

DEFINITION OF KEY TERMS

As used herein, the term "antioxidant" is hereby defined to be a reducing agent or other material which inhibits oxidation, degradation or rancidity of another material or acts as a free radical scavenger. See Hawley's Condensed Chemical Dictionary (12th Ed. 1993) at page 90, which is hereby incorporated by reference. The term "oxidation", as used herein, is defined to mean any reaction in which electrons are transferred. Hawley's at page 861, which is hereby incorporated by reference. Antioxidants include, but are not limited to, metal complexes, metal salts, phosphines, thiols, aromatic hydrocarbons, some aliphatic compounds, and oxygenated aromatics. All other classes of antioxidants are envisioned.

A reducing agent may be any compound capable to reduce another compound. Reducing agent may be chosen from thiols, for example cysteine, homocysteine or thiolactic acid, the salts of these thiols, the phosphines, the bisulphite, the sulphites, thioglycolic acid, and also its esters, in particular glycerol monothioglycolate, and thioglycerol. Reducing agent may also be chosen from borohydrides and derivatives thereof, for instance the salts of borohydride, of cyanoborohydride, or triacetoxyborohydride or of trimethoxyborohydride: sodium salts, lithium salts, potassium salts, calcium salts, quaternary ammonium (tetramethylammonium, tetraethylammonium, tetra-n-butylammonium or benzyltriethylammonium) salts; catechol borane.

Proposed Mechanism of Adhesive Formulation

In characterizing the adhesive mechanisms of mussels and oysters, we propose a mechanism of adhesive formulation and action. We propose that each of these organisms utilize oxidative organic radical chemistry as part of their adhesive system. Mussel adhesive is the system for which we have the most data and can propose a mechanism of adhesive formation.

FIG. 1 illustrates a mechanism of adhesive formation including cohesive protein cross-linking and adhesive surface bonding. Iron-induced oxidation chemistry generates a protein-based radical. As illustrated in the top left corner of FIG. 1, multiple 3,4-dihydroxyphenylalanine (DOPA) residues react with Iron ($Fe^{3+}$) and oxygen ($O_2$) and generate protein based radicals. Please note that the $Fe(DOPA)_3$ complex in the top right corner is depicted as one catecholate and two O—O chelates.

As shown in FIG. 1, these radicals can couple to each other for cohesive bonding (illustrated as cohesive protein cross linking) as well as couple to surfaces for adhesive interactions (illustrated as adhesive surface bonding). The radicals provide us with a target to attack for antifouling efforts.

Method of Fouling Suppression

Figure 2:
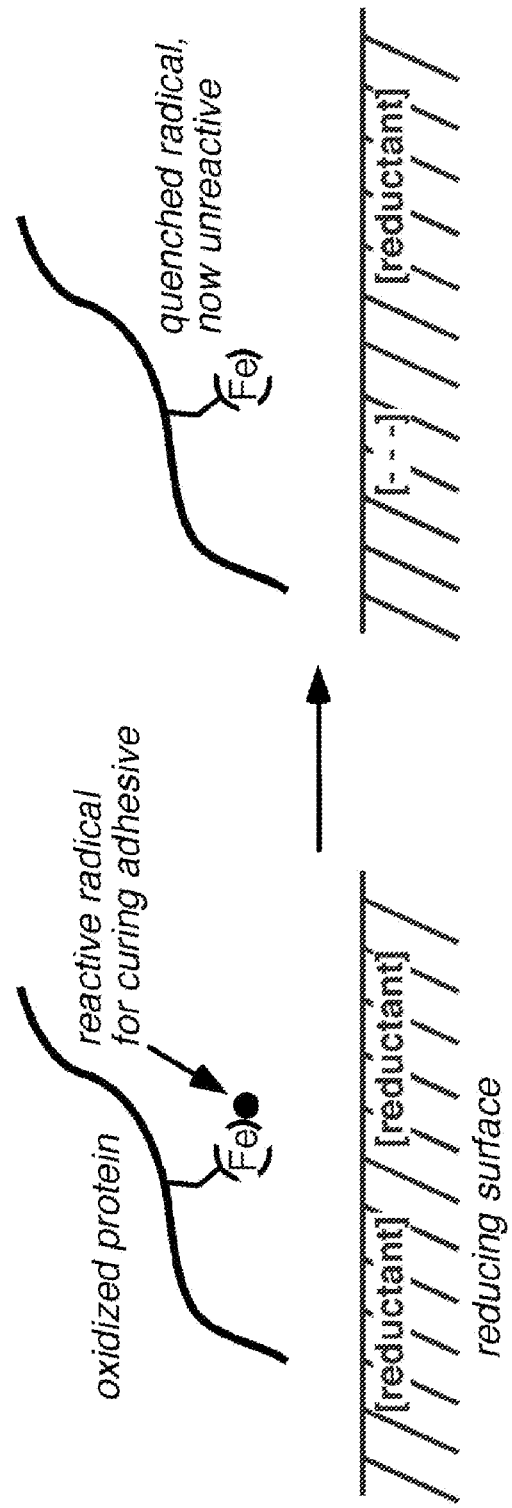
FIG. 2 is a schematic of images depicting a mechanism based approach to antifouling.

As illustrated in FIG. 2, a method of inhibiting marine fouling includes suppression of marine adhesion through reduction chemistry. FIG. 2 shows the general concept of an antioxidant, reducing agent, radical inhibitor and/or radical quencher (illustrated in FIG. 2 as reductant) introduced into a coating. Describing FIG. 2 is greater detail, an oxidized protein radical of a marine animal, such as a mussel, approaches the surface to attach to the surface through adhesive surface bonding, as illustrated in FIG. 1. Instead of a typical surface however, the reducing surface is an embodiment of the present disclosure. The reducing surface quenches the reactive radical within a bioadhesive of a marine animal such as a mussel, thereby preventing surface adhesive bonding or weakening cohesive bonding or both within the material. By reductively quenching the radicals, the reducing surface may suppress or significantly inhibit curing of marine bioadhesives.

This disclosure includes methods of inhibiting antifouling which include creating surface coatings into which reducing agents are suspended. Preliminary results are very encouraging for these methods of antifouling. Substantial decreases in mussel adhesion have been observed.

Our antifouling methods start with coatings. We test and find coatings which adhere well to metal panels submerged in water. Then we select and dissolve common antioxidants (the terms radical inhibitors, radical quenchers, reducing agents or antioxidants have been used interchangeably throughout this disclosure. The term adhesion inhibitor is also envisioned as a genus term.) into the coating. We then paint the coating with antioxidant onto metal panels. In finding suitable antifouling formulations, we are exploring broad arrays of commercial coatings, candidate antioxidants/reductants, and combinations thereof.

In one embodiment, we place antioxidants onto surfaces by mixing antioxidants into evaporative coatings and applying the coatings with antioxidant onto substrates. Such surfaces may quench the radical chemistry in bioadhesives, prevent curing, and decrease adhesion of the fouler. Our process includes preparing new adhesion inhibiting coatings, testing adhesion of multiple organisms (such as mussels, barnacles, bacteria), and examining the resulting changes in fouling. It is also envisioned that this process could be used in biomedical antifouling as well.

Choice of Coatings

Evaporative coatings are typically a preformed polymer dissolved in an organic solvent (or an emulsion in water). Shellacs, lacquers, and oil-based polyurethanes are examples of such evaporative coatings in which a polymer is dissolved in a (typically organic) solvent, although water-based evaporative coatings are also envisioned. Furthermore, it is also envisioned that there are numerous ways to deposit the inhibitors onto coatings, such as electrodeposition. After application to a surface the solvent evaporates, leaving behind a polymeric coating. We add antioxidants to these evaporative coatings and then cover the test panels.

Initial Testing of Evaporative Coatings

Evaporative coatings are not known to adhere to metal surfaces as well as reactive coating counterparts. Our assessment began for coating candidates by first painting aluminum, steel, and stainless steel panels with a given commercial, evaporative coating. Testing potential host coatings for marine use begins by cutting aluminum, steel, and stainless steel panels to 4"×4" dimensions. Each coating is painted on the panels using 3 independent layers (both sides). Then we would place the coated panels in sea water for a minimum of 3 weeks. Coatings that lift from the substrate, allow rusting, or increase opacity (indicating water between coating and substrate) are eliminated from further testing.

Table 1 (below) provides a sample of commercially available coatings. During the project period, we are testing approximately fifty (50) different evaporative coatings. Those that adhered well and prevented rusting are carried on to the next round of experiments.

TABLE 1

Commercial evaporative coatings to provide base coats for hosting radical inhibitors.

| | |
|---|---|
| Amerone Amerlock | Old Masters SPAR-Marine Varnish |
| Dampney Company Inc Apexior 3 | Pettit Marine Paint AlumaProtect (1 part epoxy) |
| Dow Corning Silastic T-2 | Pettit Marine Paint Pettit Protect (1 part epoxy) |
| Epifanes Epigrond Undercoat/ Prelacquer | Rust Bullet, LLC Rust Bullet |
| Epifanes Multi Marine Primer | Rust-Oleum Clean Metal Primer |
| Epifanes Fiberglass Primer | Sartomer Norsolene S-85 Aromatic Hydrocarbon Resin |
| Homax Rubberize-It Grip Dip | Top Secret Coatings One Part Epoxy Industrial Marine Paint |
| Imperial Rust No More | Valspar Tractor and Implement Enamel |
| Interlux Primocon | Valspar Truck and Trailer Enamel |
| Interlux Fiberglass No Sand Primer | Valspar Oil Base Metal Primer |
| Limco LC4000 Clear Coat | Xtreme High Build 2K with High Build 2K Activator |
| MFG Sealants Zero-Rust-Red Oxide | Zar Ultra Oil Based Polyurethane |
| Montana Val-U-Cote FE40 Chassis Black | |

Radical Inhibitor Choice

The radical inhibitor butylated hydroxytoluene ("BHT") has been a studied antioxidant during this project period. With a mild (~0.4 V) reducing potential, BHT is a common antioxidant food additive and preservative for rubbers and plastics. Here we are testing the use of BHT to quench protein-based radicals in marine bioadhesives, thereby decreasing adhesion.

We have also been using a selection process to explore the ability of additional radical inhibitors to prevent marine bioadhesive curing. Candidate radical inhibitors (also described as radical quenchers) can be separated into the categories of oxygenated aromatics, small organics, and organic soluble metal salts and complexes, among several other classes of compounds. It is envisioned that nearly any class of compounds might be suitable. For metal species, each radical inhibitor should exhibit solubility in the host coating and have the metal ion in a low available oxidation state (e.g., $Fe^{2+}$, $Cu^{1+}$) to allow for reduction of the bioadhesives.

Table 2 (below) shows a list of candidate reducing agents that should be organic soluble and compatible with the evaporative coatings. Some reducing agents that are currently being explored include 6-ethoxy-1,2-dihydro-2,2,4-trimethylquinoline (6-ethoxy), 2-tertbutyl-4-methoxyphenol and 3-tertbutyl-4-methoxyphenol (both described as "BHA"), 2,3-di-tert-butylphenol ("DTBP"), anisole, 1,2-dithioethane, pyruvic acid, ethoxyquin, and thioanisole. Dibutyltoluene ("DBT") is provided to serve as a control, with a structure and solubility similar to the radical inhibitors, but without readily accessible antioxidant properties.

TABLE 2

Potential radical inhibitors (i.e. reductants and antioxidants) to be placed in coatings for preparing antifouling surfaces.

parent inhibitor and control

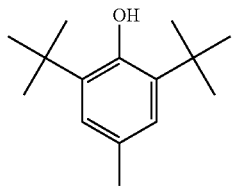

BHT
2,6-di-tert-butyl-4-methylphenol
parent radial inhibitor

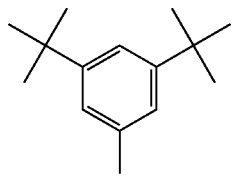

DBT
3,5-di-tert-butyltoluene
control with no reducing potential conjugated, oxygenated organics

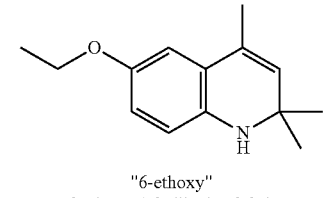

"6-ethoxy"
6-ethoxy-1,2-dihydro-2,2,4-trimethylquinoline

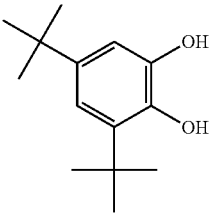

3,5-di-tert-butylcatechol

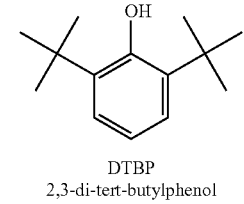

DTBP
2,3-di-tert-butylphenol

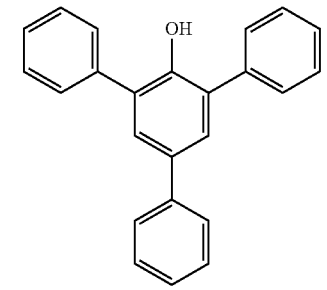

2,4,6-triphenylphenol

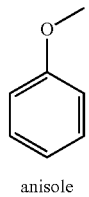

anisole

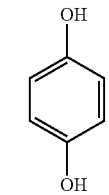

hydroquinone

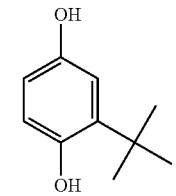

tert-butythydroquinone

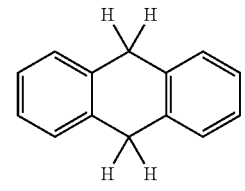

dihydroanthracene small organics

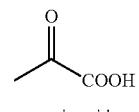

pyruvic acid

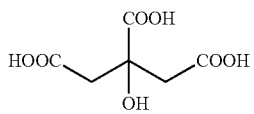

citric acid

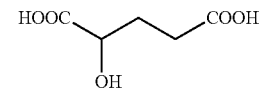

malic acid

TABLE 2-continued

Potential radical inhibitors (i.e. reductants and antioxidants) to be placed in coatings for preparing antifouling surfaces.

organic soluble metal salts and complexes

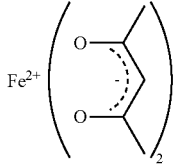

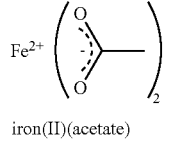

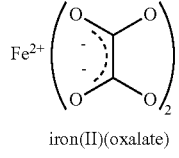

Reductive Coating Preparation

Antioxidant is added in order to make a reductive coating out of any coating. The following steps illustrate preparation of a coating according to an embodiment of the present disclosure. In order to modify Clean Metal Primer (CMP) coating into a reductive coating, 25% or 2.5% (w/w) of an antioxidant additive is added to the paint. It has been previously determined that CMP coating contains 63% solid. Our weight determinations include the weight of the antioxidant divided by the combined weight of the coating solid and the antioxidant. From this we determine that approximately 0.2067 g of antioxidant additive is to be added to every 1 g of CMP to yield a 25% (w/w) coating. We also determine that approximately 0.0159 g of antioxidant additive is to be added to every 1 g of CMP to yield a 2.5% (w/w) coating.

The following steps illustrate preparation of an epoxy coating according to an embodiment of the present disclosure. To prepare the epoxy coating: Mix 1:1 ratio of Amerlock 400 cure to Amerlock 2/400 Resin

Radical Inhibitor Application

As part of testing surfaces we apply several coatings including a control coating and reductive coatings to panels and then submerge the panels in water. By test panels we use metal panels however it is envisioned that surfaces of several types can be utilized, such as plastics (acrylic, PVC), wood, cement, rubber and glass.

The following steps illustrate preparation and application of coatings to metal panels. In order to prep aluminum plates, the plates are first washed with soap and water to remove fine particle on the surface of the plates. The aluminum plates are then rinsed with acetone and set to dry for 30 minutes, at room temperature.

Figure 7:
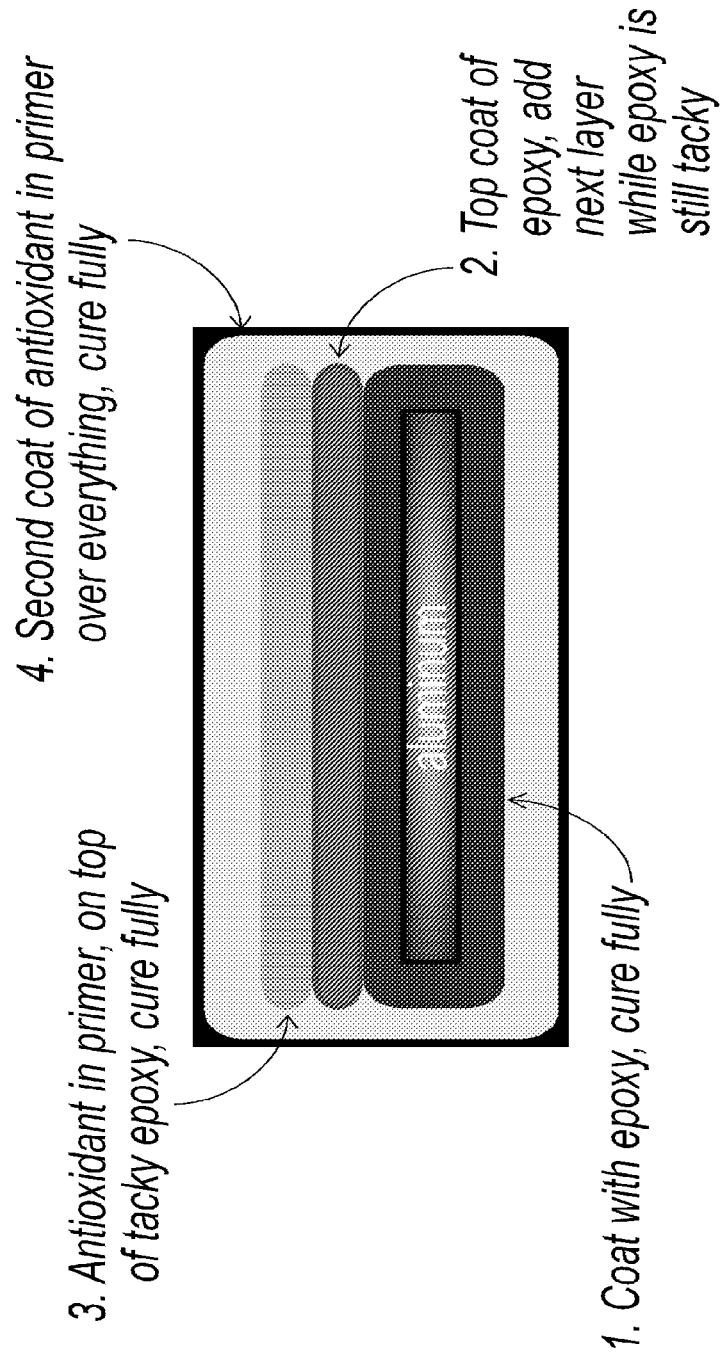
FIG. 7 is a schematic illustration of the plurality of layers of coatings on a metal panel, specifically an aluminum plate.

All layers of coatings are applied in approximately 1-2 mm in thickness. As illustrated in FIG. 7, a first layer of epoxy coating is applied to the top of an aluminum plate as well as the plate edges. The plate is left to dry for 24 hours at room temperature. After the coating has cured, any excess coating that has cured on the plate is first removed. Once any excess coating has been removed from the plate, an epoxy layer is then applied to the plate, being sure not to coat the edges. The plate is left to dry for 24 hours at room temperature. Once dried, one layer of epoxy is applied again to the backside of the plate, and the plate it let to dry only for approximately one to approximately two hours at room temperature. In an embodiment of the present disclosure, this epoxy coating should not fully cure. After approximately one to approximately two hours, the epoxy coating should feel tacky and the CMP coating with antioxidant can be applied to the top of the tacky epoxy coating and the edges of the plate. The plate is left to dry for a minimum of 2 days to ensure curing. After the coating has cured, the plate is coated with CMP coating, being sure not to coat the edges. The plate is left to dry for at least 24 hours. Lastly, after CMP coating has cured, a final CMP coating is applied to the plate and the plate is left to dry for 2 days. A vacuum oven may be used at approximately 60° C. to assist in curing.

In some cases added solvent helps the dissolution. We use the same solvent already in the commercial coating (e.g., xylenes or acetone). After curing is complete, the resulting coating is inspected and compared to the control of a similar coating without the adhesion inhibitor. If we observe a lack of curing, crystallization of inhibitors on the surface, lower coating modulus, or color changes the formulation may be discarded from consideration. Water contact angles are then measured for both the coatings and all controls (e.g., coating without inhibitor). Typically the coatings have very similar water contact angles as the controls (e.g., similar to within ~5°). Large differences in contact angles will also lead to discarding a candidate antifouling formulation.

Each of the inhibitors are mixed into evaporative coatings, typically at both approximately 2.5% (w/w) or approximately 25% (w/w). Controls included DBT as well as the coatings, alone, are diluted appropriately.

A further narrowing of candidate coatings then takes place. We examine water contact angles (i.e., surface energy) of the evaporative coatings with an antioxidant versus without an added inhibitor. Any coatings with added inhibitor that changes water contact angle by more than 5° may be eliminated from further testing. Please note that coatings may be eliminated from further testing because the modification is not as comparable to a control coating. It is envisioned that these modifications are not indicative of whether a particular reductive coating is an effective antifouling coating. Also possibly eliminated from further testing are coatings that did not cure and those that display a notably different modulus. As part of this selection process, we have approximately twenty (20) coatings to examine, into which we could place approximately eight (8) different antioxidants.

Controls

Numerous control coatings will also be prepared. The simplest control is the same evaporative coating diluted down with a solvent (e.g., xylenes) instead of the radical inhibitor. A further control will include addition of compounds similar to the radical inhibitor but without the reducing potential. For example, when examining the antifouling properties of BHT in a given coating, we also prepare controls containing DBT. Both BHT and DBT share similar structures but only BHT has redox chemistry accessible under typical marine or biological conditions.

Adhesion Measurements

Figure 3:
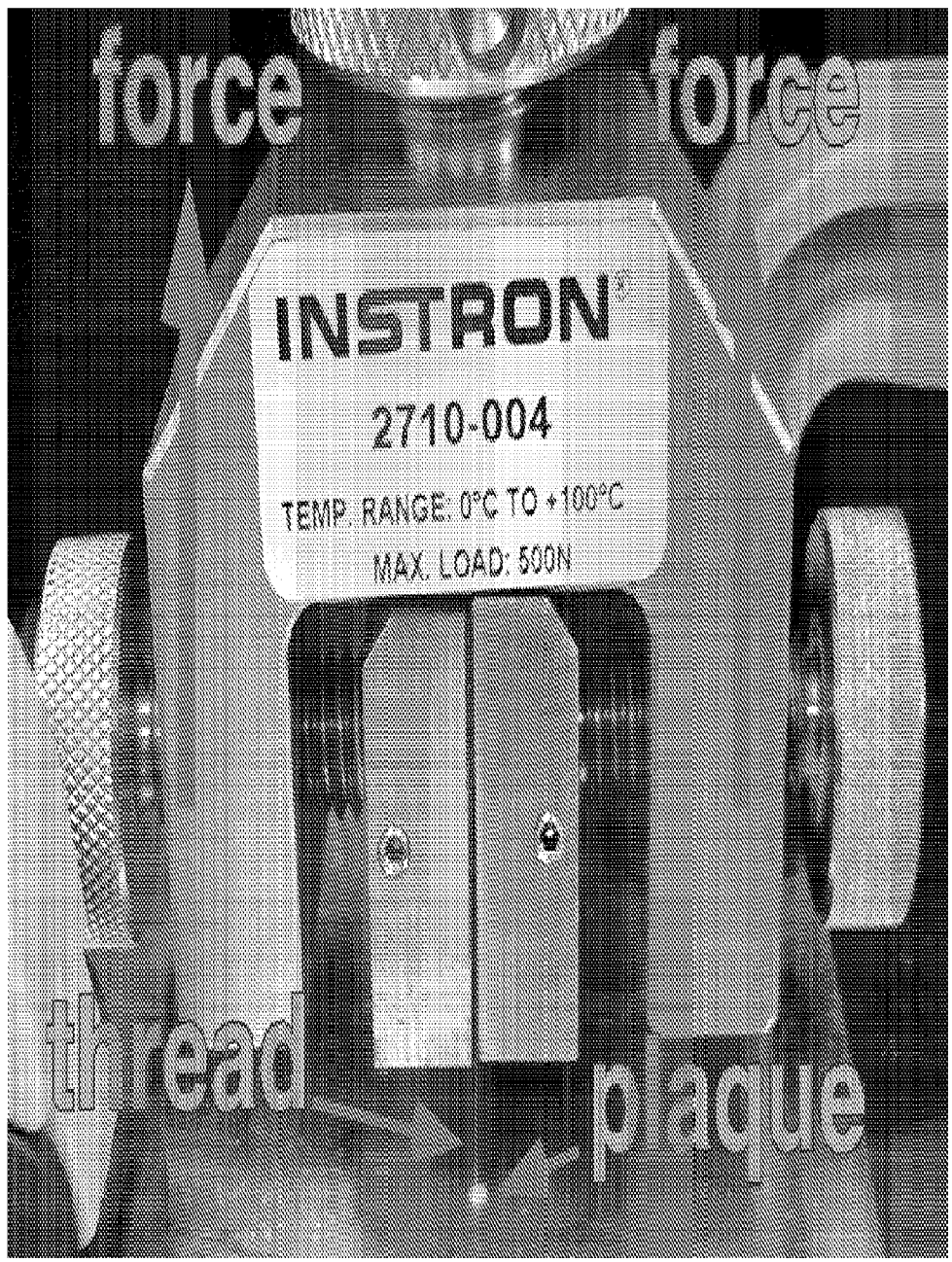
FIG. 3 is an image of an Instron materials testing system in use to measure the adhesion strength of individual mussel plaques affixed to surfaces.

In order to obtain insights on the antifouling potential of a given coating, we would benefit from a rapid laboratory method to quantify adhesion. Coatings that show decreased adhesion in such a laboratory test can then be sent to other investigators for assays with different organisms as well as field testing. We have recently developed a method for determining the adhesion strength of mussels to surfaces. The adhesive system of mussels lends itself well to precise force measurements. Mussels are placed on a candidate coating for adhesive deposition. The area ($m^2$) of each plaque is determined by digital photography and use of image analysis software. Individual plaques are then pulled from the surface using clamps in an Instron materials testing system (as illustrated in FIG. 3). The force of failure (Newtons) is divided by the plaque surface contact area ($m^2$) to yield adhesion in Pascals ($Pa=N/m^2$).

Beyond simply looking for new antifouling coatings to decrease mussel adhesion, we also take note of the adhesive failure modes on new coatings versus controls. When pulled to failure, the mussel adhesive system can exhibit adhesive failure (plaque pulling off the surface; described as "A" in failure type in Appendix A data), cohesive failure (plaque ripping apart in the bulk; described as "C" in failure type in Appendix A data), or plaque-thread junction failure (described as "T" in failure type in Appendix A data). Thread breakage is also possible but minimized to nearly zero with our adhesion method. When mussels adhere strongly to a given surface, more cohesive failure is often observed or a mix of both cohesive and adhesive failure. If we inhibit curing of the glue with radical inhibitors on the surface, we may find that more adhesive or cohesive failure is observed. Overall, use of this mussel adhesion assay provides quantitative data on the ability of a candidate antifouling coating to inhibit bioadhesion. Here we will use this assay on each coating. Coatings that decrease mussel adhesion substantially will be carried on to further testing.

Method for Measuring Adhesion Force

Generally speaking, total adhesion of a system is a function of both the force required to break the bonding between two surfaces and the overlap (or contact) area of the materials. Adhesion data are typically reported in Pascals, or Newtons of force to bring about detachment divided by the overlap area in square meters ($Pa=N/m^2$). Alternatively, adhesion data may be quantified in pounds of force per square inch of overlap (PSI). In order to obtain accurate adhesion measurements, we need methods to quantify both maximum detachment force as well as the contact area between the material and surface. With bulk synthetic materials, detachment force measurements are often performed by lap shear methods such as the ASTM D1002 standard. However, these procedures do not lend themselves well to studies of biological systems owing to the small quantities of material generally available and the irregular shapes. In the case of mussels, the arrangement of the byssal assembly, threads, and plaques further complicates collection of adhesion data.

As an operative example, the animal adheres to a given surface (e.g., aluminum plate). In order to have consistent degrees of curing for each sample, adhesion is measured three (3) days after deposition of adhesive by the animal. The animal is removed by cutting the connecting threads at the shell line. At this point, we are left with the surface, an adhesive plaque, and the thread.

Adhesion forces must be normalized for surface contact area. Complete adhesion measurement methods includes obtaining data on the plaque-surface contact area. Mussel plaques are typically not perfect circles or ovals. The small size (approximately 2 mm diameter) and irregular shape may complicate obtaining accurate areas.

Prior to adhesive testing, a photograph is taken of the plaque. A Nikon (Melville, N.Y., USA) D80 digital camera fitted with a Nikon 50 mm f-1.8 lens and a Kenko 12 mm extension tube is held on a small tripod while the lens is oriented directly onto the plate below. The lens is approximately 18 cm above the plates being photographed. Typical exposure settings include f=3.5, 1/15 second shutter speed, and 200 ISO. Ambient light should be sufficient to capture the images. Photographs are taken in JPEG format at maximum resolution (~3.3 MB per image). Individual plaques are numbered using a marker prior to taking the photograph so that the numbers are included in the image. These labels allow correlation of specific plaques to tensile strength data. At the time of photographing the plaques, area standards are also photographed. Coins provide convenient standards. Photographing a plate takes 30 seconds, thereby allowing immediate collection of tensile strength data.

The digital images of the plates can be later revisited for calculating surface area. Image analysis software counts pixels within the plaque, relative to a standard, to provide area ($m^2$).

As shown in FIG. 3, an Instron 5544 (Norwood, Mass., USA) materials testing system is then used to measure the tensile adhesion force of a given plaque-thread combination of an individual mussel plaque affixed to a surface. Plates bearing plaques and threads are clamped to the base of the Instron1 5544 materials testing system. A custom designed stainless steel base is fabricated for these experiments. The base is a circular platform 15 cm in diameter with a post and pinhole on the bottom, allowing bolting into the bottom mount of the Instron. Test plates with adhesive are fastened to this base with two Quick-Grip Handi Clamps (Wilmington, Ohio, USA) holding down opposite corners. The Instron is fitted with one screw-action grip (part 2710-004) on the top and a 5N load cell. Detachment force measurements begin by lowering the grips directly over an individual plaque. The thread is lifted by hand and is placed in between the grips. The grips are then tightened over the thread. The thread and clamps are oriented such that the upward pull would be perpendicular to the surface and provide a tensile measurement. Grips are positioned as close to the surface as possible, in order to cover the entire thread. Pulling up on the entire thread minimizes thread breakage, thereby eliminating a failure mechanism that would otherwise complicate data analysis. Having the entire thread covered by the clamps meant that we cannot easily see the threads and measure the exact angle of upward force, relative to the surface. As much as possible, the thread is arranged between the clamps to approximate a 90° angle of pull.

Figure 4:
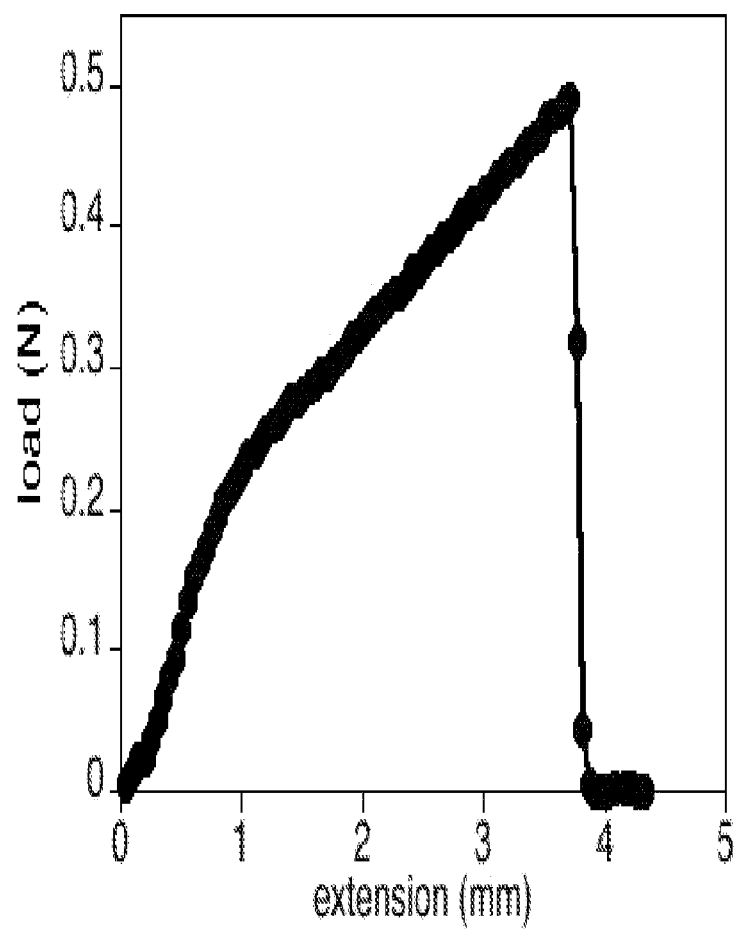
FIG. 4 is a schematic example of an extension-versus-load plot for an individual adhesive plaque and thread.

Grips hold the thread connected to a plaque, pulling the thread up 90° from the surface at constant velocity (10 mm/min) until adhesive failure. FIG. 4 shows a typical example of such a plot for a single adhesive plaque and thread. During upward travel, force is measured (in Newtons). The point at which a plaque releases from the surface shows a sharp drop in load, thereby providing a maximum adhesive force for a given plaque.

Surface areas of the plaques are determined from the digital images taken of each plate prior to obtaining detachment force data. Using Photoshop Elements 4.0 (San Jose, Calif., USA) software, an outline of each plaque perimeter is manually drawn. The number of pixels contained within each plaque is obtained from an image histogram. Digital photographs are also taken, under identical conditions, of circular objects to provide area standards. For example, an image taken of a coin is traced to determine the area in pixels. Pixels are then converted to area using the known size of the standards. Final adhesive performance of each plaque is then determined by dividing the failure force (in Newtons) by the area (in $m^2$) to yield values in Pascals ($Pa=N/m^2$).

The threads have two distinct regions, an elastic, portion proximal to the mussel and a crystalline, harder, section distal to the mussel. These threads may break at each region at different times or forces, prior to adhesive plaque failure ("thread breakage"). The thread-plaque junction can break apart ("thread-plaque failure"). "Cohesive failure" within the plaque is possible, when the plaque is torn apart. Separation of an entire, intact plaque from a surface constitutes "adhesive failure". The root junction, where the threads join inside the animal, can break apart and release threads. The entire root structure, where the threads are anchored, may also fail. With each plaque adhesion measurement we also record the mode of material failure. Adhesive failure ("A"), cohesive failure ("C"), or plaque-thread failure ("T") are noted under the heading Failure type in Appendix A.

Radical Inhibitors Reduce Adhesion

An exemplary formulation is comprised of the reducing agent butylated hydroxytoluene (BHT) in a metal primer coating. Metal primer control coatings and primer with 2.5% or 25% BHT (w/w) coatings look similar by eye, optical microscopy, hardness, and water contact angle measurements. For example, the water contact angle measurements are approximately 106° for the metal primer coating and approximately 108° for the metal primer coating with BHT. Mussels are placed on these 2.5% and 25% BHT-in-primer coatings as well on primer-only controls. Table 3 shows data indicating that the average mussel adhesion decreases significantly upon addition of BHT. Not only is the average measured adhesion of each plaque lower but the animals also produce less adhesive on the BHT-containing panels. By combining the number of plaques produced with the adhesion per plaque we can estimate that the total force needed to remove a mussel drops by up to half when BHT is in the coating.

TABLE 3

Mussel plaque adhesion to plates of a primer coating versus primer containing BHT, showing that BHT decreases adhesion.

| Sample | Adhesion | # of plaques (average) | force to detach animal |
|---|---|---|---|
| primer control | 184 ± 68 kPa | 11.3 plaques | ~5.6 N |
| primer + 2.5% BHT | 135 ± 58 kPa | 9.6 plaques | ~3.4 N |
| primer + 25% BHT | 110 ± 43 kPa | 5.2 plaques | ~2.2 N |

We have also been exploring the ability of other radical inhibitors to decrease adhesion. Other radical inhibitors are examined. Tables 4A and 4B show summary data from Appendix A.

TABLE 4A

Mussel plaque adhesion to plates of a primer coated with control, BDT, versus primer containing 25% antioxidants, showing that 25% antioxidants decreases adhesion.

| Sample | Mean Adhesion (kPa) | Adhesive Failure (kPa) | % Adhesive Failure | Plaques/ Mussel | Total Animal Removal Force |
|---|---|---|---|---|---|
| 25% DBT | 53.1 | 57.3 | 31.6% | 17.2 | 986 |
| 25% 6-ethoxy | 34.6 | 33.7 | 76.4% | 18.4 | 620 |
| 25% anisole | 59.1 | 56.8 | 54% | 17.4 | 988 |
| 25% DTBP | 42.0 | 40.4 | 70.7% | 16.9 | 683 |
| 25% BHT | 39.5 | 37.0 | 44.7% | 11.1 | 411 |

TABLE 4B

Mussel plaque adhesion to plates of a primer coated with
control, BDT, versus primer containing 2.5% antioxidants,
showing that 2.5% antioxidants decreases adhesion.

| Sample | Mean Adhesion (kPa) | Adhesive Failure (kPa) | % Adhesive Failure | Plaques/ Mussel | Total Animal Removal Force |
|---|---|---|---|---|---|
| 2.5% DBT | 45.8 | 49.3 | 7.0% | 24.1 | 1430 |
| 2.5% 6-ethoxy | 33.9 | 33.6 | 90.9% | 22.3 | 749 |
| 2.5% anisole | 39.7 | 42.0 | 21.1% | 20.1 | 844 |
| 2.5% DTBP | 66.5 | 56.9 | 17.6% | 30 | 1707 |
| 2.5% BHT | 41.5 | 41.5 | 66.7% | 17.4 | 722 |

Tables 4A and 4B indicate that the total animal removal force (the total force needed to remove a mussel) decreases significantly upon addition of 6-ethoxy, anisole, DTBP, and BHT.

TABLE 4C

Recent data on Mussel plaque adhesion to plates
of a primer coated with control, BDT, versus primer
containing 25% antioxidants. Table 4C data obtained
with variations made in comparison to Table 4A.

| Sample | Adhesion (kPa) | Adhesion STDEV | Average Force (N) |
|---|---|---|---|
| 25% DBT | 47.07 | 9.14 | 0.2198 |
| 25% BHT | 37.08 | 12.48 | 0.1894 |
| 25% Anisole | 33.53 | 8.33 | 0.1686 |
| 25% DTBP | 34.11 | 8.33 | 0.1902 |
| 25% Ethoxyquin | 21.23 | 7.58 | 0.0948 |

Figure 5:
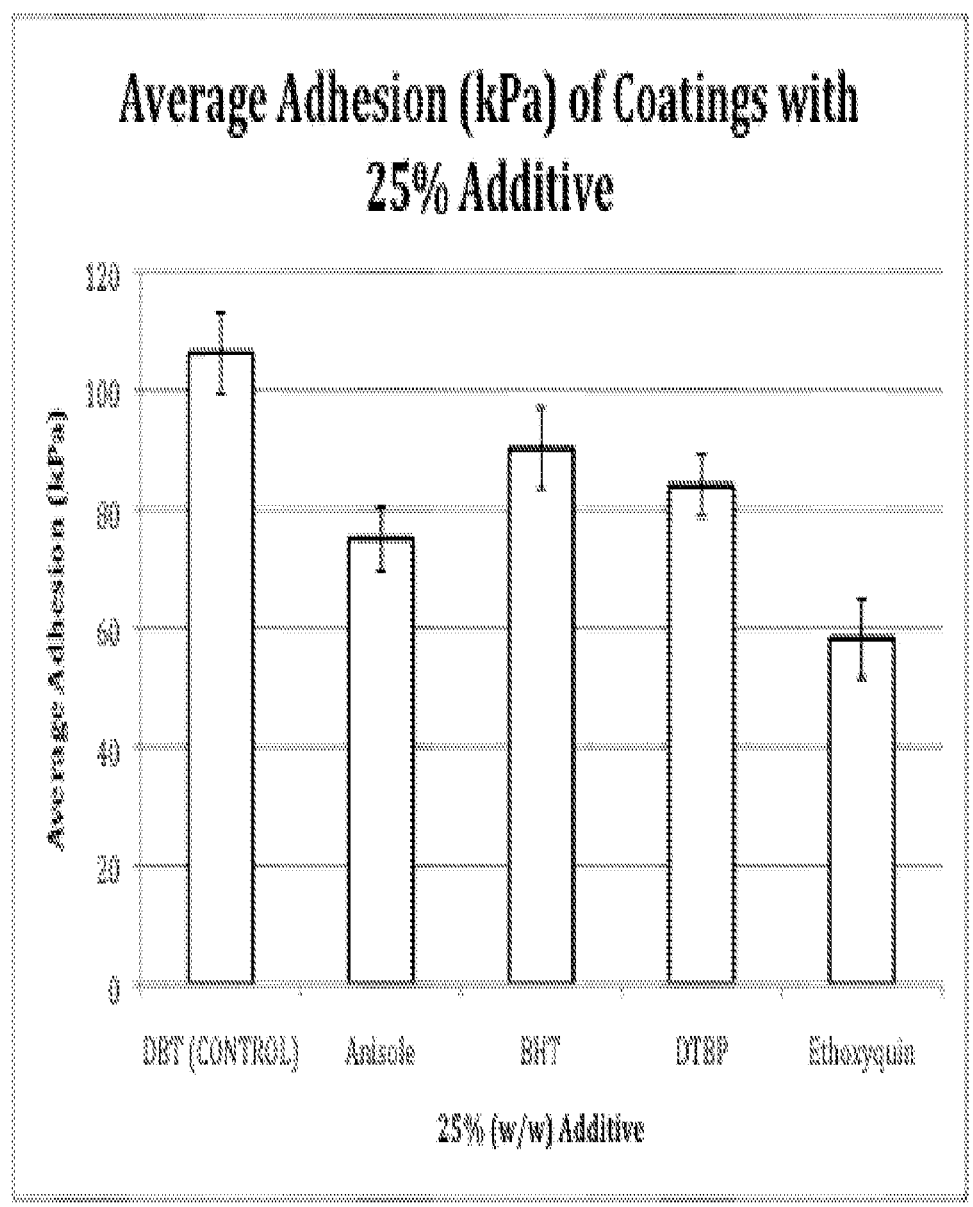
FIG. 5 is a graph illustrating average adhesion of mussel on an antioxidant coating of an embodiment of the present disclosure, the antioxidant coating including 25% antioxidant additive.

Table 5A and FIG. 5 illustrate more recent testing with the same general result: reduced mussel adhesion with reductive coatings including antioxidant.

TABLE 5A

Average Adhesion with Confidence Interval (CI) of 99% for 25% (w/w) Coating

| | Coating: 25% (w/w) | | | | |
|---|---|---|---|---|---|
| | DBT | Anisole | BHT | DTBP | Ethoxyquin |
| Average Adhesion (kPa) with 99% CI | 106.34 ± 6.74 | 75.02 ± 5.39 | 90.24 ± 6.84 | 82.63 ± 5.24 | 58.22 ± 6.73 |

Figure 6:
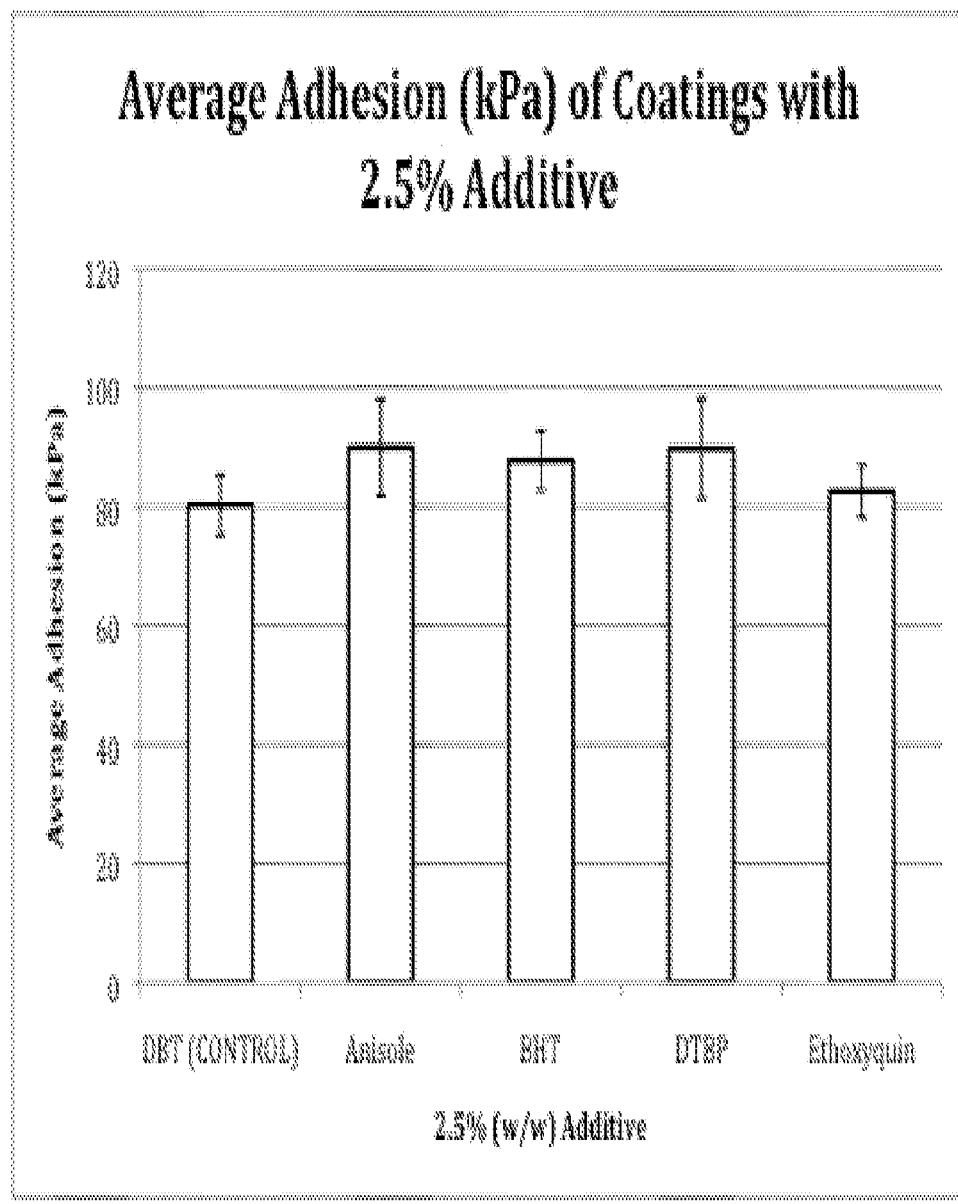
FIG. 6 is a graph illustrating average adhesion of mussel on an antioxidant coating of another embodiment of the present disclosure, the antioxidant coating including 2.5% antioxidant additive.

Table 5B and FIG. 6 illustrate more recent testing suggesting that the results at this concentration level are all about the same. These results may also indicate that methods of inhibiting fouling are occur at higher concentration of antioxidant.

TABLE 5B

Average Adhesion with Confidence Interval (CI) of 99% for 2.5% (w/w) Coating

| | Coating: 2.5% (w/w) | | | | |
|---|---|---|---|---|---|
| | DBT | Anisole | BHT | DTBP | Ethoxyquin |
| Average Adhesion (kPa) with 99% CI | 80.31 ± 5.08 | 90.03 ± 8.16 | 87.82 ± 4.98 | 89.88 ± 8.45 | 82.60 ± 4.42 |

We find that DTBP, 6-ethoxy, anisole, and pyruvic acid can all reduce mussel adhesion. These results indicate that, as a class, reducing coatings including antioxidants hold promise for antifouling efforts.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. An antifouling coating comprising:
   an antioxidant coating coupled to surfaces submerged in sea water,
   wherein the antioxidant is chemically unaltered by the coating,
   wherein the antioxidant is present in the coating in an amount sufficient to suppress oxidant-induced marine adhesion and free radical-induced marine adhesion, and
   wherein the antioxidant coating is one of a plurality of coats.

2. The coating of claim 1 wherein the coating adheres to surfaces submerged in sea water.

3. The coating of claim 1, wherein the antioxidant coating is a top coat of the plurality of coats.

4. An antifouling coating comprising:
   an antioxidant coating coupled to surfaces submerged in sea water,
   wherein the antioxidant is chemically unaltered by the coating,
   wherein the antioxidant is a reducing agent present in an amount sufficient to suppress oxidative-induced marine adhesion and free radical-induced marine adhesion, and
   wherein the antioxidant coating is one of a plurality of coats.

5. An antifouling coating comprising:
   an antioxidant coating coupled to surfaces submerged in sea water,
   wherein the antioxidant is chemically unaltered by the coating, wherein the antioxidant is one of a radical inhibitor and a radical quencher, wherein the antioxidant is present in an amount sufficient to suppress oxidative-induced marine adhesion and free radical-induced marine adhesion, and wherein the antioxidant coating is one of a plurality of coats.

6. The coating of claim 1, wherein the antioxidant is BHT.

7. A method of inhibiting marine fouling comprising the steps of:

providing an antioxidant coating, wherein antioxidant is present in the antioxidant coating in an amount sufficient to suppress oxidant-induced marine adhesion and free radical-induced marine adhesion applying the antioxidant coating to a surface, wherein the surface is configured to be submerged in sea water, and wherein the antioxidant coating is one of a plurality of coats, and suppressing marine adhesion through reduction chemistry.

8. The method of claim 7 wherein the coating suppresses marine adhesion by reducing the strength of marine adhesion.

9. The method of claim 7, wherein the coating is an evaporative coating.

10. The method of claim of 9, wherein the evaporative coating is clean metal primer.

11. The method of claim 9, further comprising the steps of:
providing the antioxidant which is soluble in a solvent of the coating and
dissolving the antioxidant in the solvent of the coating.

12. The method of claim 7, wherein the step of suppressing marine adhesion includes the step of:
reducing or quenching oxidative adhesion chemistry of a marine animal.

13. The coating of claim 1, wherein the antioxidant is selected from the group consisting of 6-ethoxy-1,2-dihydro-2,2,4-trimethylquinoline (6-ethoxy), 2-tertbutyl-4-methoxyphenol and 3-tertbutyl-4-methoxyphenol (both described as "BHA"), 2,3-di-tert-butylphenol ("DTBP"), anisole, 1,2-dithioethane, pyruvic acid, ethoxyquin, and thioanisole.

14. The method of claim 13, wherein the antioxidant is selected from the group consisting of 6-ethoxy-1,2-dihydro-2,2,4-trimethylquinoline (6-ethoxy), 2-tertbutyl-4-methoxyphenol and 3-tertbutyl-4-methoxyphenol (both described as "BHA"), 2,3-di-tert-butylphenol ("DTBP"), anisole, 1,2-dithioethane, pyruvic acid, ethoxyquin, and thioanisole.

15. The method of claim 3, wherein the antioxidant coating is only the top coat of the plurality of coats.

16. The method of claim 3, wherein at least one coat of the plurality of coats, apart from the top coat, is an epoxy coating.

* * * * *